United States Patent
Ahmed et al.

(10) Patent No.: US 10,505,472 B2
(45) Date of Patent: Dec. 10, 2019

(54) ELECTRONIC MOTOR CONTROLLER SYSTEM AND METHOD

(71) Applicants: Asif J Ahmed, Maineville, OH (US); Brian J Celenza, Seattle, WA (US)

(72) Inventors: Asif J Ahmed, Maineville, OH (US); Brian J Celenza, Seattle, WA (US)

(73) Assignee: MODERN PROPULSION, LLC, Maineville, OH (US)

(*) Notice: Subject to any disclaimer, the term of this patent is extended or adjusted under 35 U.S.C. 154(b) by 17 days.

(21) Appl. No.: 15/863,469

(22) Filed: Jan. 5, 2018

(65) Prior Publication Data

US 2018/0191276 A1 Jul. 5, 2018

Related U.S. Application Data (60) Provisional application No. 62/442,505, filed on Jan. 5, 2017.

(51) Int. Cl.

| H02P 6/06 | (2006.01) |
|---|---|
| H02P 27/06 | (2006.01) |
| H02P 5/48 | (2016.01) |
| B62D 5/04 | (2006.01) |
| H02P 21/22 | (2016.01) |
| H02P 6/10 | (2006.01) |
| H02P 6/17 | (2016.01) |
| H02P 6/08 | (2016.01) |
| H02P 6/18 | (2016.01) |
| H02P 21/24 | (2016.01) |

(52) U.S. Cl.
CPC .............. *H02P 6/06* (2013.01); *B62D 5/046* (2013.01); *H02P 5/48* (2013.01); *H02P 6/085* (2013.01); *H02P 6/10* (2013.01); *H02P 6/17* (2016.02); *H02P 6/18* (2013.01); *H02P 21/22* (2016.02); *H02P 21/24* (2016.02)

(58) Field of Classification Search
CPC .................................. H02P 6/06; H02P 27/06
See application file for complete search history.

(56) References Cited

U.S. PATENT DOCUMENTS

| 2008/0265829 A1* | 10/2008 | Hayashi | H02P 21/26 318/781 |
|---|---|---|---|
| 2015/0042247 A1* | 2/2015 | Kusakawa | B25F 5/00 318/139 |
| 2015/0123579 A1* | 5/2015 | Liu | H02M 1/126 318/400.05 |

* cited by examiner

*Primary Examiner* — Cortez M Cook
(74) *Attorney, Agent, or Firm* — Taft Stettinius & Hollister LLP; Anthony P. Filomena, II (57) ABSTRACT

An electronic speed control system and method is disclosed to control motors that power a load. The electronic speed control system is configured to monitor the motors, accept user commands for the motors, to process these inputs along with various motor parameters and/or models, and to generate motor commands to send to the motors. A field oriented control method continuously monitors voltages and currents from each motor phase; accesses the motor parameters; uses a model of the motor to calculate motor rotor flux, angle and speed based on the stator voltages and currents and the motor parameters; and generates motor commands for controlling the motor based on the user commands and the calculated values. The electronic speed control system can also control external accessories, and/or communicate with external applications which can include a motor identification system that can provide the motor parameters and model for the motor.

12 Claims, 6 Drawing Sheets

ELECTRONIC MOTOR CONTROLLER SYSTEM AND METHOD

CROSS-REFERENCE TO RELATED APPLICATIONS

This application claims priority to U.S. Provisional Patent Application Ser. No. 62/442,505, filed Jan. 5, 2017 entitled "ELECTRONIC MOTOR CONTROLLER SYSTEM AND METHOD", the disclosure of which is expressly incorporated herein by reference.

FIELD OF THE DISCLOSURE

The present disclosure relates to motor controller systems and methods, and in particular to electronic motor controllers for brushless, permanent-magnet synchronous motors (PMSM) for miniaturized applications.

BACKGROUND AND SUMMARY

Brushless motors have become ubiquitous in the consumer market. Due to their inherent efficiency, low-maintenance, and power-to-weight ratio, brushless motors are the de facto standard for many electric propulsion systems. However, virtually all brushless control systems on the market today use an inefficient speed control method called scalar control (also known as trapezoidal control). Scalar control, while inexpensive and easy to implement, is plagued by a number of issues, including low torque production, high torque ripple, vibration and noise, low energy efficiency and decreased motor life. It would be desirable to resolve one or more of these issues by using a sensorless field-oriented control (FOC) algorithm. Field-oriented control of brushless electric motors has not been successfully implemented in a miniaturized, battery-powered system designed for use with personal electric vehicles.

An electronic speed controller is disclosed to control a motor that powers a motor load. The electronic speed controller includes a motor port, a throttle port, a power port, a processor and a memory. The motor port is configured to send motor commands to the motor and receive motor inputs from the motor. The throttle port is configured to receive user commands. The power port is configured to receive power to power the speed controller. The processor is configured to receive the user commands and the motor inputs, and to generate the motor commands based on the user commands and the motor inputs. The memory is configured to store data for use by the processor.

The electronic speed controller can also include an external accessories port configured to send accessory commands to an external accessory, and to receive accessory inputs from the external accessory. The electronic speed controller can also include a data communications port configured to communicate with external applications. One of the external applications can be a motor identification system with a plurality of sets of motor parameters, where each set of motor parameters characterizes a particular motor type.

The motor port can include a motor analog-to-digital converter (ADC), wherein the motor ADC is configured to receive the motor signals in digital form from the processor and transform those motor signals to analog form to send to the motor, and the motor ADC is configured to receive the motor inputs in analog form from the motor and transform those motor inputs to digital form to send to the processor. The throttle port can include an analog-to-digital converter (ADC) throttle input port and a pulse-width modulation (PWM) throttle input port configured to receive the user commands from a throttle unit.

A field oriented control method for a motor is disclosed where the motor is a three-phase permanent-magnet synchronous motor (PMSM). The field oriented control method includes continuously monitoring stator voltages and currents from each of the three motor phases; accessing motor parameters for the motor; using a mathematical model of the motor to calculate rotor flux, rotor angle and rotor speed based on the stator voltages and currents from each of the three motor phases and the motor parameters; receiving user commands for the motor; and generating motor commands for controlling the motor based on the user commands and the calculated rotor flux, rotor angle and rotor speed.

Additional inventions are also described in the detailed description that follows and the figures.

BRIEF DESCRIPTION OF THE DRAWINGS

The disclosure will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Embodiments of the system and method disclosed can be used for electronic speed control of brushless, permanent-magnet synchronous motors for miniaturized applications, such as personal electric vehicles (e-bikes (electric bikes), e-scooters (electric scooters), e-skateboards (electric skateboards)), remote control (r/c) vehicles, multirotor drones, camera gimbals, robotics, etc. The system can be a sensorless, closed-loop electronic speed controller. The system and method can include a motor identification process, a user interface, and supporting software and architectural design for interfacing with and configuring electronic speed controllers. An embodiment of the system and method for electronic speed control of a personal electric vehicle is described herein, but those of skill in the art will understand how the principles described can be used in other applications.

Figure 1:
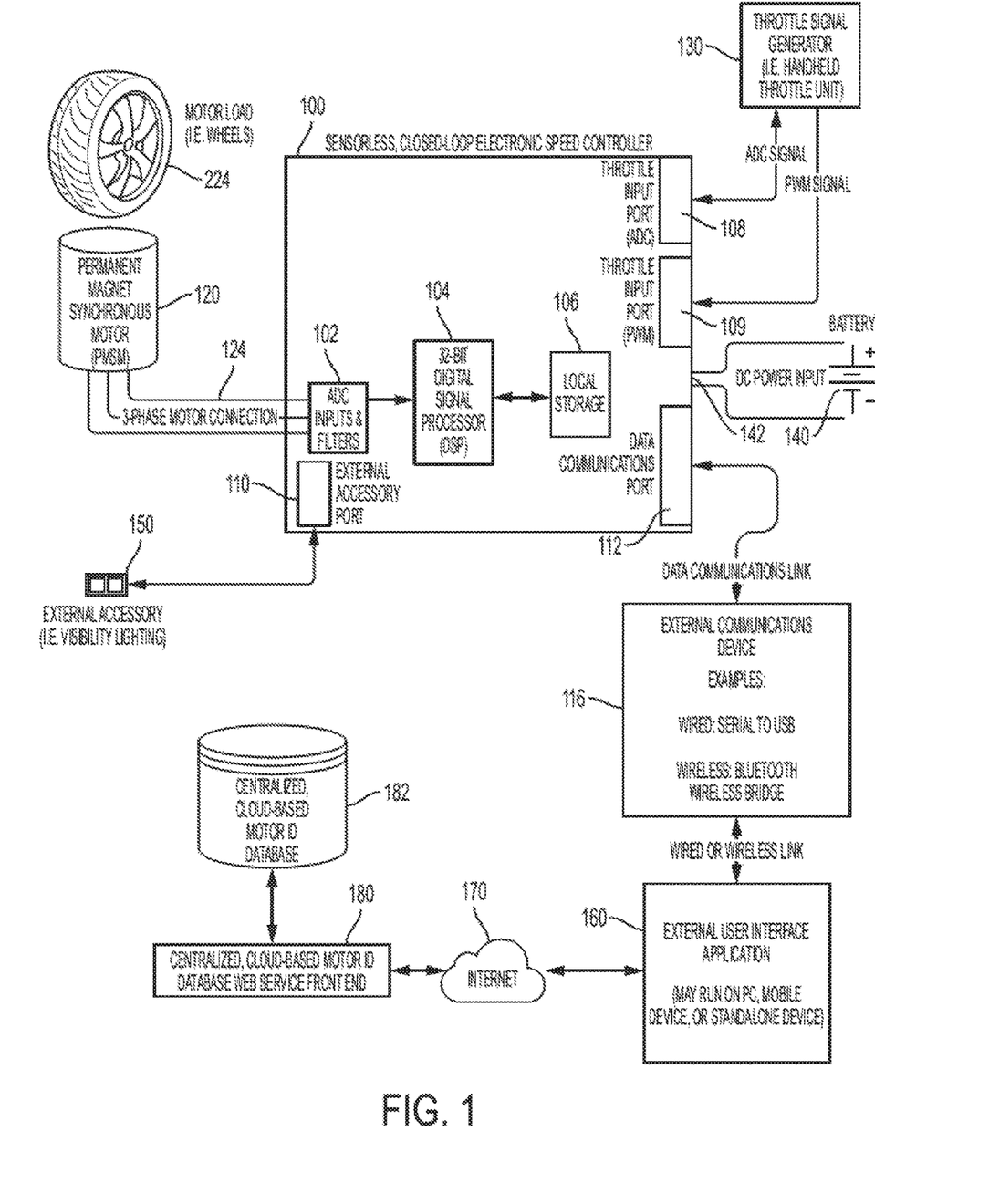
FIG. 1 illustrates an electronic speed controller used with a permanent-magnet synchronous motors (PMSM) that powers a motor load.

FIG. 1 illustrates an electronic speed controller 100 used with permanent-magnet synchronous motors (PMSM) 120 that power motor loads 122, which in the illustrated embodiment are powered wheels. Each speed controller 100 can control a motor 120 which can control one or more motor loads 122. A user can use a handheld throttle unit 130 with user controls to generate user command signals, including a throttle signal, sent to the speed controller 100 for controlling the motor 120. A battery 140 provides power to the speed controller 100. The speed controller 100 can also communicate with and control external accessories 150 or provide status indications. For example visibility lights can be an external accessory, or a display or lights could provide status information such as current speed, torque, etc.

The speed controller 100 can also communicate with or include an external data communications interface 116 for communicating with external user applications 160. The external data communications interface 116 can be a wired interface (one example being a serial to USB interface) or a wireless interface (one example being a Bluetooth wireless bridge). The external user applications 160 can run on personal computers, tablets, smart phones, or other electronic devices. The external user applications 160 can communicate with a motor identification system 180 over a network 170. The network 170 can be, for example, the Internet or other wide-area or local area network. The motor identification system 180 can include a motor identification database 182.

In the embodiment illustrated in FIG. 1, the speed controller 100 is a sensorless, closed-loop electronic speed controller that includes an analog-to-digital converter (ADC) 102, a digital signal processor (DSP) 104, memory 106, an ADC throttle input port 108, a PWM throttle input port 109, an external accessory port 110 and a data communications port 112. The DSP 104 receives/sends data through the ADC throttle input port 108, PWM throttle input port 109, external accessory port 110 and data communications port 112. The communications port 112 may interface with external devices using Serial Communications (UART), Controller Area Network (CAN), Inter-Integrated Circuit ($I^2C$), Serial Peripheral Interface (SPI) or other protocol.

Communication between the motor 110 and the controller 100 can occur through the ADC 102 which can send/receive analog signals across a three-phase motor connection 124 with the motor 120, and send/receive digital signals to the DSP 104. The ADC 102 can include multiple analog-to-digital converters and filters for processing the signals between the motor 120 and the DSP 104. The memory 106 provides local storage on the controller 100 for the DSP 104. The memory 106 may be in the form of Electrically Erasable Programmable Read-Only Memory (EEPROM), Ferroelectric Random-Access Memory (FRAM), Flash memory or other memory type.

Communication between the controller 100 and the throttle unit 130 occurs through the ADC throttle input port 108 and/or the PWM throttle input port 109 which receives the user command signals, including the throttle signal from the throttle unit 130. Communication between the controller 100 and the external accessories 150 occurs through the external accessory port 110 which sends accessory control signals or status signals to one or more external accessories 150 or status indicators. Communication between the controller 100 and external user applications 160 occurs through the data communications port 112. The external data communications interface 116 can be part of the speed controller 100, in which case it can include the data communications port 112, or it can be part of a separate device in which case it communicates with the controller 100 through the data communications port 112 (as illustrated in FIG. 1).

Figure 2A:
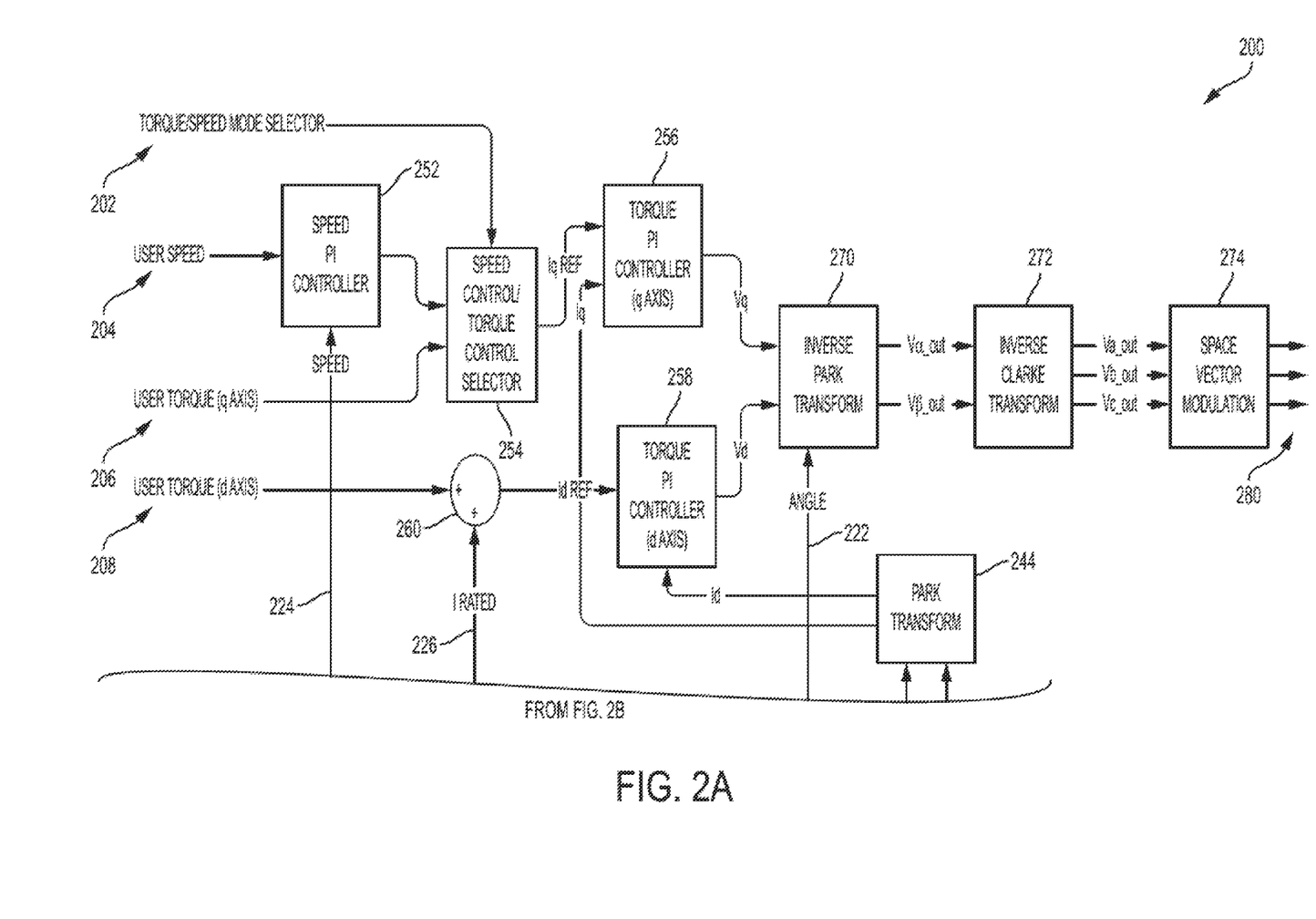
FIG. 2 illustrates an exemplary flow of a field oriented control process using a software-based sensor.
Figure 2B:
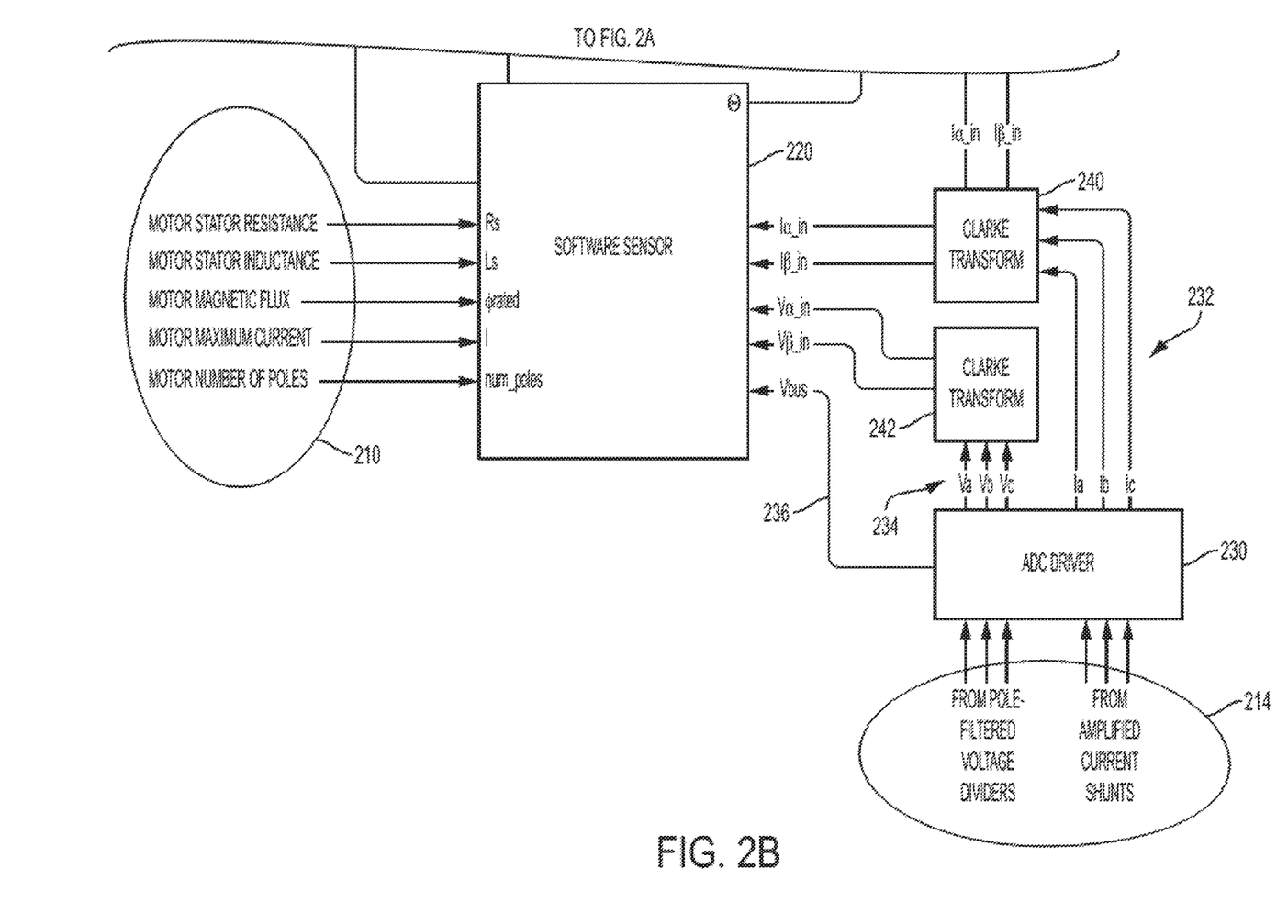

FIG. 2 illustrates an exemplary flow of a field oriented control process 200 using a software-based sensor 220.

Closed-loop commutation can be accomplished by implementing Field Oriented Control, also known as Vector Control, in a miniaturized footprint. Field Oriented Control is an established motor commutation method used in industrial applications. Such industrial devices are commonly referred to as variable frequency drives (VFD).

Field Oriented Control is a motor commutation method in which the stator currents of a three-phase permanent-magnet synchronous motor (PMSM), for example motor 120, are decomposed from a stationary reference frame (time and speed-dependent) into a rotating reference frame (time-invariant) that can be visualized as a vector. The resultant vector contains two components—magnetic flux (d axis) and torque (q axis). Thus, with torque and flux decoupled, they can be controlled independently. In order to decompose the stator currents into their flux and torque components, the rotor angle must be known. The rotor angle is typically measured by a dedicated physical sensor attached to the motor (typically hall effect sensors or a rotary encoder). A sensorless solution using a software-based sensor 220 can be used to track rotor angle and eliminate the need for a physical sensor. The software-based sensor 220 can continuously monitor voltages and currents from each of the three motor phases using pole-filtered voltage dividers and amplified current shunt resistors. The software-based sensor 220 can use a mathematical model of the motor to track rotor flux and extrapolate rotor position and rotor speed. Thus, the software-based sensor can determine the rotor angle from motor parameters and eliminate the need to physically sense rotor angle.

The field oriented control process 200 can be used in many applications and will be described here with reference to the system illustrated in FIG. 1. The field oriented control process 200 can be implemented on the DSP 104, ADC 102, and memory 106 of the speed controller 100. FIG. 2 shows three sets of inputs to the field oriented control process 200. A first set of run-time throttle inputs can be communicated by the user using the flight controller 130. The first set of run-time throttle inputs can include a torque/speed mode selector 202, a user speed 204, a q-axis user torque 206 and a d-axis user torque 208. A d-q coordinate system can be used for control with orthogonal components along the d (direct) axis and the q (quadrature) axis. The d-q coordinate system can be superimposed to a motor's instantaneous (a, b, c) three-phase sinusoidal system. Components of the d-q coordinate system current vector, allow conventional control such as proportional and integral (PI) control as with a DC motor.

A second set of motor identification inputs 210 can be calculated as part of a motor identification process using parameters measured and entered during the motor identification process. The motor identification process can use the motor identification system 180 and/or user provided parameters entered through the external user applications 160. The motor identification process and parameter calculations will be explained below. The second set of motor identification inputs 210 can include motor stator resistance and inductance, a motor magnetic flux, a motor maximum current and a motor number of poles. The second set of motor identification inputs 210 are input to the software-based sensor 220.

A third set of motor monitoring inputs 214 can be provided by continuously monitoring the voltages and currents from each of the three motor phases for each controlled motor 120. The voltages from each of the three motor phases can be monitored by pole-filtered voltage dividers connected to the three-phase motor connection 124, and the currents from each of the three motor phases can be monitored by amplified current shunts connected to the three-phase motor connection 124. The voltage dividers and current shunts can be included in the ADC 102. The third set of motor monitoring inputs 214 are received by an analog-to-digital converter (ADC) driver 230.

The ADC driver 230 converts the voltages and currents from each of the three motor phases for each of the controlled motors 120 into instantaneous stator current readings 232 for each phase, instantaneous stator voltage readings 234 for each phase and a bus voltage 236. The bus voltage 236 can be input to the software-based sensor 220.

With the rotor position known from monitoring by the software-based sensor 220, the three-phase stator currents 232 can be transformed into a stationary two-phase alpha-beta reference frame using a first Clarke Transform 240, and the three-phase stator voltages 234 can be transformed into the stationary two-phase alpha-beta reference frame using a second Clarke Transform 242. The Clarke Transform, or alpha-beta transform, is well known to those of skill in the art. The current outputs $I_{\alpha\_in}$ and $I_{\beta\_in}$ of the first Clarke Transform 240 and the voltage outputs $V_{\alpha\_in}$ and $V_{\beta\_in}$ of the second Clarke Transform 242 are input to the software-based sensor 220. The software-based sensor 220 tracks the rotor angle θ 222 for each motor 220 using the applicable motor identification inputs 210 and the currents and voltages derived from the motor monitoring inputs 214.

The software-based sensor 220 uses the inputs described to calculate a rotor angle θ 222, a motor speed 224 and a rated current 226. The software sensor 200 can use a flux observer pattern to calculate the rotor angle θ 222 and the motor speed 224 from its inputs. The motor speed 224 can be derived from integrating the rotor angle θ 222. The rated current 226 is a user-provided parameter and can be defined as part of the motor identification process.

The current outputs $I_{\alpha\_in}$ and $I_{\alpha\_in}$ of the first Clarke Transform 240 are also input to a Park Transform 244 that transforms the monitored motor current from the two-phase alpha-beta reference frame into the direct-quadrature reference frame $I_q$ and $I_d$. The Park Transform, or direct-quadrature-zero transform, is well known to those of skill in the art. Decomposing the three-phase stator currents 232 into flux and torque using mathematical operations of the Clarke Transformation and the Park Transformation is computationally intensive, and should be computed at a very high frequency, for example tens of kilohertz or more. Thus, Field Oriented Control requires significant computing power and it is desirable to use a powerful processor in the speed controller 100, for example a 32-bit digital signal processing integrated circuit.

Once the stator currents have been decomposed into flux and torque, closed-loop control can be achieved using common Proportional-Integral (PI) controllers. The speed controller 100 can provide closed-loop torque control using a torque (q axis) PI controller 256 and a flux (d axis) PI controller 258, as well as closed-loop speed control using a speed PI controller 252.

The user can select whether to control the desired speed of each motor 120 using the speed controller 100 by controlling the torque or speed of the motor 120. The user indicates this preference using the torque/speed mode selector 202 which controls a speed/torque control selector 254.

When the user selects speed mode, the speed PI controller 252 is enabled. The speed PI controller 252 takes a user-provided speed setpoint 204 and a motor speed value 224 calculated by the software-based sensor 220, and outputs a speed based torque (q axis) current reference to the speed/torque control selector 254.

The speed/torque control selector 254 also receives the user-provided q-axis torque setpoint 206. When the user selects speed mode, the speed/torque control selector 254 passes the speed based torque (q axis) current reference calculated by the speed PI controller 252 to the torque (q axis) PI controller 256. When the user selects torque mode, the speed/torque control selector 254 passes the user-provided q-axis torque setpoint 206 to the torque (q axis) PI controller 256.

A summing block 260 calculates a torque (d axis) current reference $I_{d\_ref}$ by adding the d-axis user torque setpoint 208 to a rated motor current 226 calculated by the software-based sensor 220.

The torque (q axis) PI controller 256 takes the q axis current reference $I_{q\_ref}$ output by the speed/torque control selector 254 and the measured q-axis current $I_q$ output by the Park Transform 244 and computes a q-axis voltage $V_q$. The torque (d axis) PI controller 258 takes the d axis current reference $I_{d\_ref}$ output by the summing block 260 and the measured d-axis current $I_d$ output by the Park Transform 244 and computes a d-axis voltage $V_d$.

To commutate the motor using the closed-loop PI controllers, the flux and torque components can first be transformed back into their original, three-phase (time and speed dependent) form. This can be accomplished using an Inverse Park Transform 270 (inverse direct-quadrature-zero transformation) and Inverse Clarke Transform 272 (inverse alpha-beta transformation).

The Inverse Park Transform 270 takes the direct-quadrature domain voltage values, $V_d$ and $V_q$, and the rotor angle θ 222 calculated by the software-based sensor 220, and computes output voltages in the alpha-beta domain, $V_{\alpha\_out}$ and $V_{\beta\_out}$. The Inverse Clarke Transform 272 takes the output voltages in the alpha-beta domain, $V_{\alpha\_out}$ and $V_{\beta\_out}$, and computes three-phase output voltages 280, $V_{a\_out}$, $V_{b\_out}$ and $V_{c\_out}$.

A space vector modulation 274 takes the resulting three-phase output voltages 280, $V_{a\_out}$, $V_{b\_out}$ and $V_{c\_out}$, and sends them across the three-phase motor connection 124 to the phase windings of the motor 120 in the form of sinusoidal waveforms using Space Vector Modulation (SVM). Space Vector Modulation modulates direct-current (DC) pulse-width modulation (PWM) signals to create alternating (AC) current waveforms.

Field Oriented Control algorithms use prior knowledge of the motor being commutated. Specifically, the mathematical model uses knowledge of the motor's stator resistance, stator inductance (for both q and d axes), magnetic flux, maximum current rating, and number of magnetic poles. These motor parameters can be provided externally and stored for use by the software sensor 220 which can be implemented on the motor controller 100. Alternatively, the motor controller 100 may be provided in conjunction with a particular motor to which it has already been configured to incorporate the motor parameters.

Since the motor controller 100 can support a wide variety of permanent-magnet synchronous motors 120, several features can be incorporated to facilitate access to the applicable motor parameters. The data communications port 112 can be used for interfacing with external devices for configuring motor and user parameters. A user interface 160 can be used for communicating with the motor controller 100 from external devices/applications. A state machine process can be used by the motor controller 100 to automatically measure motor parameters. The state machine process can be implemented on-board the motor controller 100. The user interface 160 can enable the user to manage the motor identification process. To further reduce complexity, the motor indexing system 180 for PMSM motors and the centralized motor index database 182 can be used for submission, retrieval and sharing of motor identification data, allowing the user to circumvent motor identification altogether in many cases.

Figure 3:
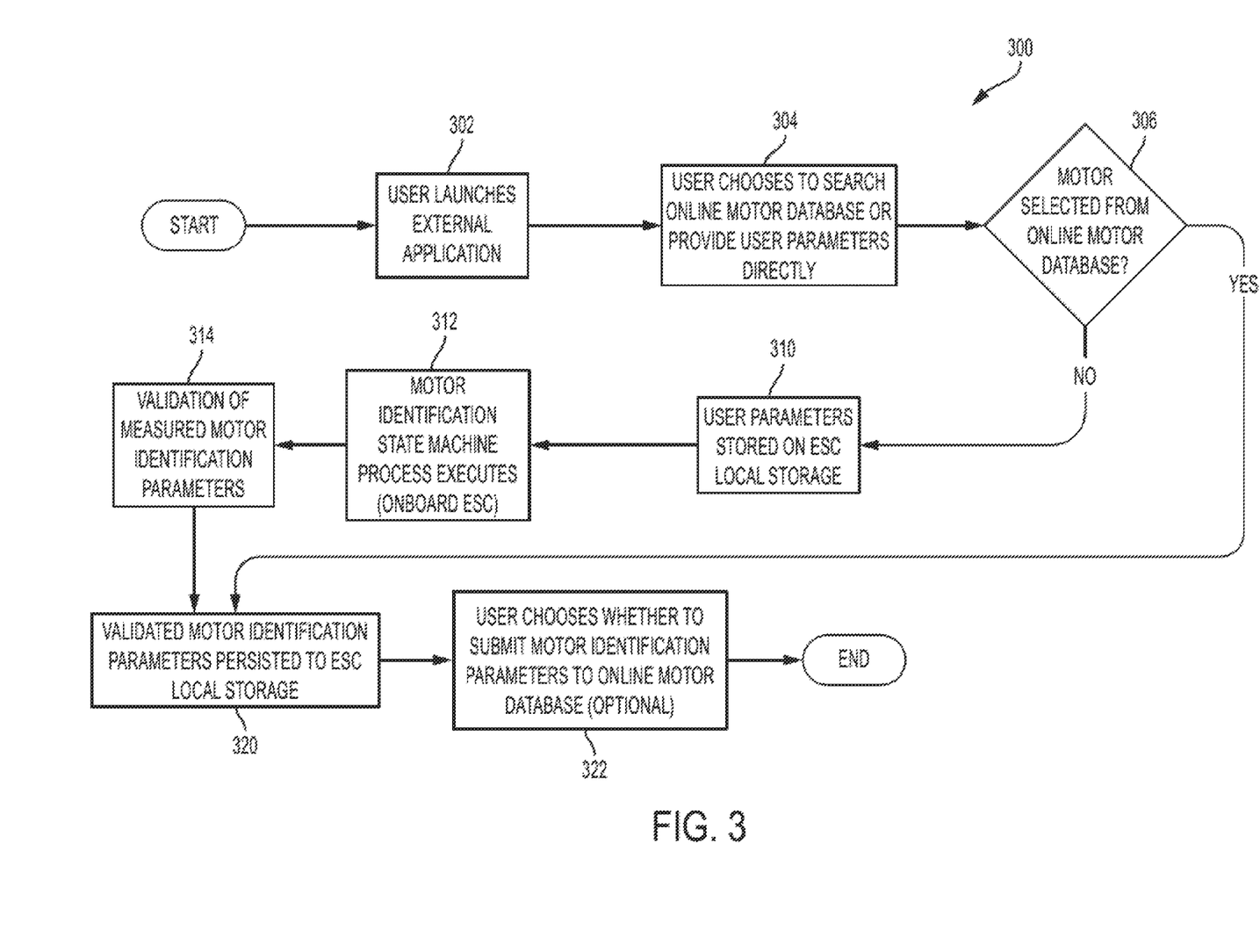
FIG. 3 illustrates a high-level overview of an exemplary motor identification process that can be run on a motor controller.

The motor control system can include a motor identification process that determines motor parameters for use during control of a specific motor. FIG. 3 shows a high-level overview of an exemplary motor identification process 300 run on the speed controller 100. At block 302, the user launches the motor identification process. At block 304, the user chooses to provide motor parameters to the motor identification process 300 by either using the motor identification system 180 or by entering the necessary motor parameters directly through the external user interface application 160. The motor identification system 180 can include an online motor database updatable by users with new motor parameters, and searchable by users by entering various motor identifiers and/or parameters to find a set of motor parameters for an unfamiliar motor. At block 306, the system determines whether the motor parameters were provided using the motor identification system 180. If the motor parameters were provided using the motor identification system 180 then control passes to block 310, otherwise control passes to block 320.

At block 310, the motor identification process 300 stores the user entered motor parameters in local storage 106 of the speed controller 100. At block 312, the speed controller 100 executes a motor identification state machine process to measure motor parameters for the controlled motor 120. Then at block 314, the speed controller 100 validates the user entered motor parameters for use in the state machine process.

At block 320, the motor control process 300 stores the validated user entered motor parameters or the motor parameters from the motor identification system 180 in the local storage 106 for operation of the speed controller 100. At block 322, the motor control process 300 asks the user whether they want to submit the user entered and validated motor parameters for the controlled motor 120 into the motor identification system 180. Entering the motor parameters for the controlled motor 120 into the motor identification system 180 can make those parameters accessible by other users.

Figure 4A:
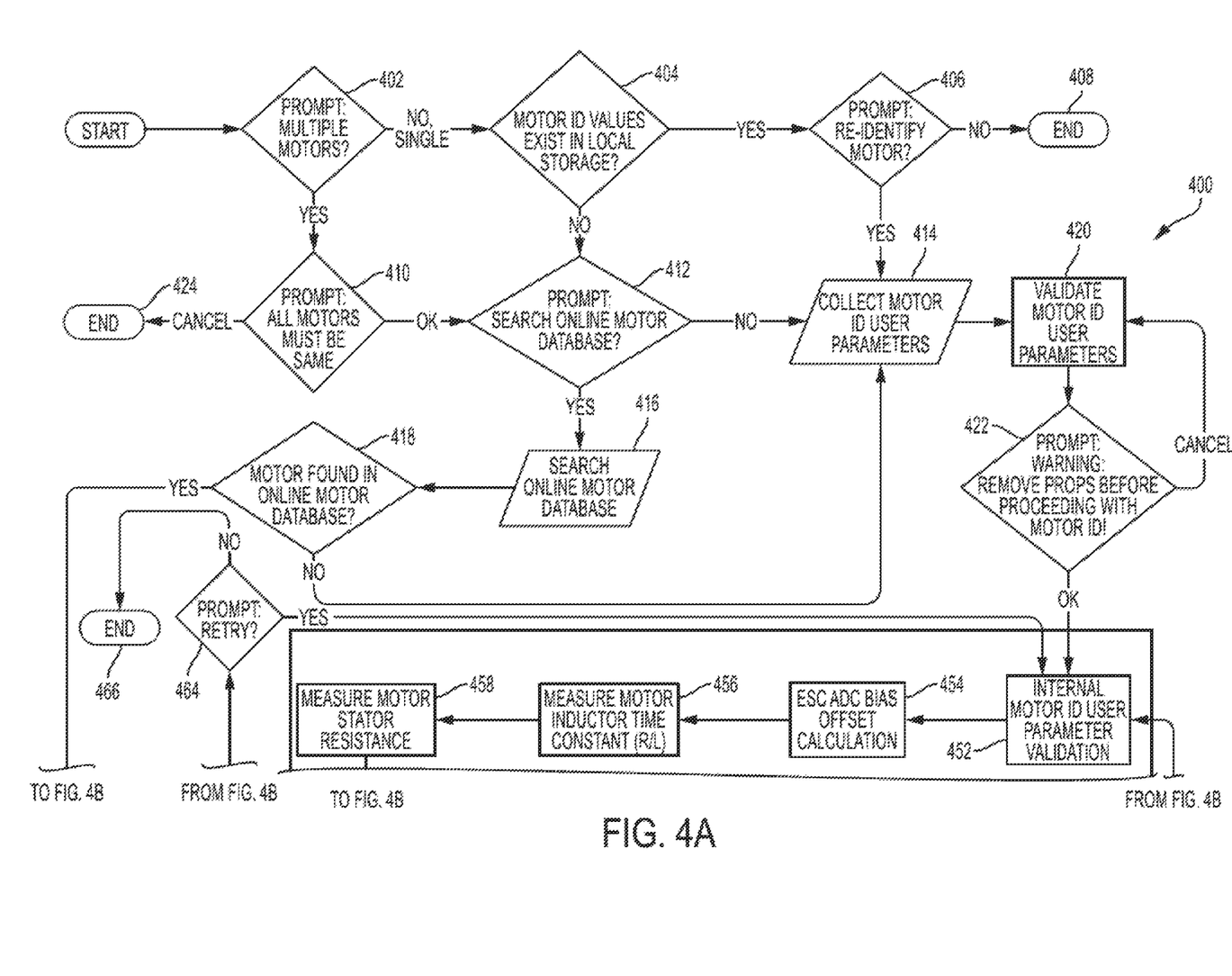
FIG. 4 illustrates a more detailed flow of an exemplary motor identification process that can be run on a motor controller.
Figure 4B:
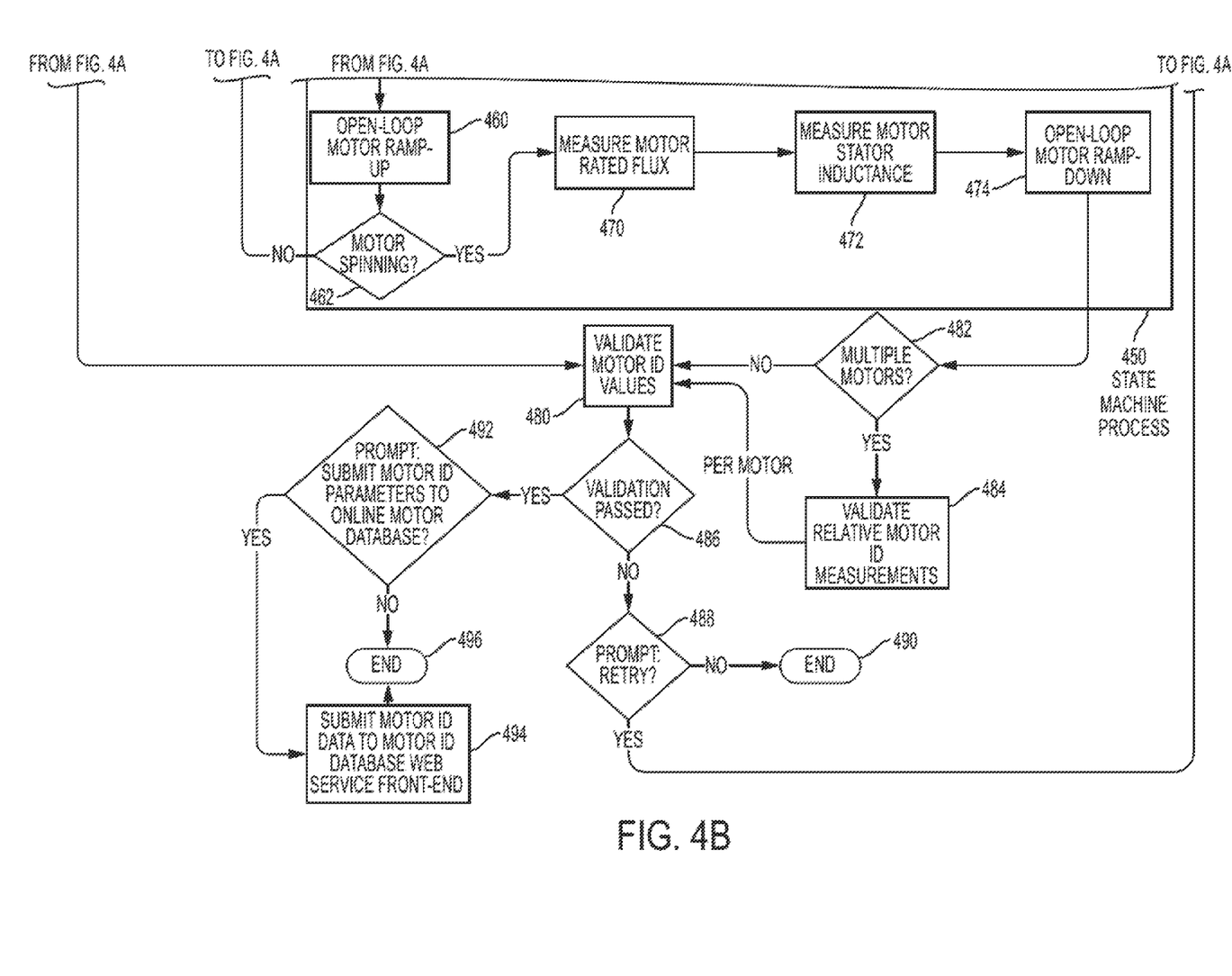

FIG. 4 shows a more detailed flow of an exemplary motor identification process 400. The motor identification process includes a state machine workflow 450 that can be run on-board the motor controller 100, and can be invoked by an external action, such as a user input.

The exemplary motor identification process 400 begins by validating that it has all of the required input parameters for the motor. At block 402, the process asks the user whether the motor controller 100 will be controlling multiple motors 120. If the user indicates that there are multiple motors then control passes to block 410. If the user indicates that there is a single motor then control passes to block 404.

At block 404, the process checks whether the motor identification values already exist in local storage, for example memory 106. If the motor identification values already exist in local storage then control passes to block 406. If the motor identification values do not already exist in local storage then control passes to block 412.

At block 406, the process asks the user re-identify the motor. If the user does not re-identify the motor then the process ends at block 408. If the user re-identifies the motor then control passes to block 414.

At block 410, if the user chooses to cancel the process or indicates that the motors are not the same then the process ends at block 418. If the user indicates that the multiple motors are the same then control passes to block 412.

At block 412, the process asks the user whether it should search a motor database, such as the motor identification system 180, for the motor parameters. If the user indicates to search a motor database then control passes to block 416. If the user indicates not to search a motor database then control passes to block 414.

At block 416, the process searches the motor database for motor parameters and control passes to block 418. At block 418, the process determines if the motor was found in the motor database. If the motor was not found in the motor database then control passes to block 414. If the motor was found in the motor database then control passes to block 480.

At block 414, the process collects motor identification parameters from the user and control passes to block 420. The motor identification parameters can include, for example, maximum current rating and number of magnetic pole pairs. At block 420, the process validates the motor identification parameters provided by the user. The validation at block 420 can be basic validation that simply checks that the parameters are of the correct type, and within acceptable ranges based on knowledge of the system. At block 422, the process notifies the user to make safe any rotating mass before the process proceeds with validation of the motor identification parameters and waits for user confirmation. If the user does not indicate that the system has been made safe then control passes back to block 420. If the user indicates that the system has been made safe then control passes back to block 452.

At block 452, the process begins internal motor identification user parameter validation and control passes to block 454. At block 454, the process performs an Analog-to-Digital Converter (ADC) bias offset calibration. The ADC bias offset calibration minimizes measurement error of the sensitive analog circuitry used to measure the motors phase voltages and phase currents.

Then at block 456, the process measures the motor's inductor time constant (L/R). This measurement serves as a validation step for the motor identification process, as this time constant must fall within an acceptable range for the electronic speed controller to properly commutate the motor. If the value falls outside the acceptable range, the process cannot continue. If the inductor time constant does not pass validation, the motor identification process will fail, and the user can be prompted to retry.

Then at block 458, the process calculates the motor's stator resistance. This calculation can be done using Ohm's law.

Then at block 460, the process ramps the (unloaded) motor up to a predetermined speed (typically around 300-500 rpm) using open-loop commutation. The process then maintains this ramped speed and uses information from the software sensor 220 to verify motor speed.

Then at block 462, the process confirms that the motor is spinning as part of the ramp up. If the motor is not spinning then control passes to block 464. If the motor is spinning then control passes to block 470.

At block 464, the process prompts the user if they want to retry spinning the motor. If the user indicates not to retry then the process ends at block 466. If the user indicates to retry then control passes back to block 452.

At block 470, the process measures the magnetic flux within the spinning motor. Then at block 472, the process measures the motor stator inductance (for both q and d axes). Then at block 474, the process ramps the unloaded motor back down to zero speed using open-loop commutation and control passes to block 482.

At block 482, the process checks whether there are multiple motors. If there are not multiple motors then control passes to block 480. If there are multiple motors then control passes to block 484. At block 484, the process validates relative motor identification requirements and control passes to block 480. The relative motor identification can compare the results from all of the multiple motor identifications—since all of the motors are typically of the same type to use multiple motor identification, these values are usually similar. For example, a quadcopter would have four motors, and this relative motor identification check could check that each of the four electronic speed controllers 200 came up with similar motor identification values for each of the four motors.

At block 480, the motor identification state machine process validates that all of the measured parameters are within predetermined acceptable ranges. This can be a check to make sure that none of the motor identification values are clearly erroneous. At block 486, the process checks whether motor parameter validation was successful. If motor parameter validation was successful then the Identified values for the motor are persisted to on-board storage and control passes to block 492. If motor parameter validation was not successful then control passes to block 488.

At block 488, the user is presented with an error and a prompt to retry the process. If the user indicates not to retry the process then the process exits at block 490. If the user indicates to retry the process then control passes back to block 452.

At block 492, the process asks the user if they want to submit the identified motor parameters to the motor database, for example the motor identification system 180. If the user indicates not to submit the identified motor parameters to the motor database then the process exits at block 496. If the user indicates to submit the identified motor parameters to the motor database then control passes to block 494. At block 494, the process submits the identified motor parameters to the motor database, and then the process exits at block 496.

The data communications link 112 and the user interface 160 between the electronic motor controller(s) 100 and an external device, for example a PC, mobile device, or standalone (purpose-built) device can be used by the user to invoke and manage the motor identification process running on-board the motor controller 100.

The communications link 116 may be established between one or more electronic motor controllers 100 and an external device by means of a wired or wireless link. For a wired link, the electronic motor controllers 100 may provide a data communications port that is directly compatible with the external device, or an adapter device may be required to convert digital signals from the electronic motor controllers 100 into a format appropriate for the external device. An example of this is a serial communications device, which provides connectivity to the motor controllers 100 and a PC via a USB or Serial port. For a wireless link, the motor controllers 100 may provide built-in wireless connectivity, or a wireless bridge device may be required to facilitate the wireless link. An example of this is a Bluetooth wireless bridge device, which provides a wireless link between the motor controllers 100 and a Bluetooth-equipped device, such as a smartphone.

The user interface 160 can be a software application running on an external device, such as a PC, mobile device, or standalone (purpose-built) device, and having an established communications link to the motor controller 100 using one of the aforementioned methods. The user interface 160 can also include access to a centralized, cloud-based motor index system 180 for the storage, retrieval, and sharing of motor identification data using a motor identification database 182.

The system 160 can provide a step-by-step interface for configuring one or multiple motor controllers 100. The interface can include the following interactions. The interface can check for Internet connectivity on the external device (if applicable), and prompt the user to search the centralized motor database 182 to see if the motor already exists in the database 182. The user can choose to accept this prompt, or skip searching the database. If the user accepts the prompt to search the motor database, the user can be prompted for search terms (i.e. make, model, etc.). Upon entering search terms, a database search can be performed in the centralized database 182 and any relevant search results returned and displayed to the user, sorted by relevance. A confidence rating can also be displayed for each search result. The confidence rating can provide an indicator of the quality of the motor identification data for a given motor, and can be based on the number of instances that motor has been submitted to the database. A motor that has been identified and submitted by several users can be given a higher confidence rating than a motor that has been identified and submitted by one user (or few users).

If the user finds the correct motor in the search results, the user can select that motor. When the user selects a motor from the search results, the system can display the details for that motor, along with an option to configure the motor controller(s) 100 for that motor. If the user selects this option, the motor identification state machine can be bypassed, and the motor parameters from the centralized database 182 can be sent to the motor controller(s) 100.

If the user declines to search the motor database, or if Internet connectivity is unavailable, the user interface 160 can prompt the user for the parameters required by the motor identification process, such as maximum current rating and number of magnetic pole pairs. Motor metadata such as make, model, dimensions, photo, etc. can also be collected at this time. Depending on the application, additional parameters may be captured to facilitate application-specific functionality on the motor controller 100. Examples include capturing motor kV (rpm/volt) rating in order to calculate motor maximum speed for speed-controlled applications, or capturing wheel/tire size in order to calculate rotor inertia for personal electric vehicle applications.

Once the application has captured all required motor parameters, the user can be prompted to ensure a safe operating environment and the system can begin the state machine process on each motor controller 100. The state machine process can run on each motor controller 100 in the manner described above.

Upon completion of the motor identification state machine process, the calculated motor parameters can be further verified. If validation does not pass or if the motor identification state machine process reports an error, the user can be prompted to retry the process. In the case of multiple motor controllers 100, an additional validation step can be performed by verifying that all identified motors have calculated parameters within a predetermined tolerance (for example, 10%) of each other. This validation can assume that all motors are of the same specification.

After all validation checks have been passed, the user can be presented with a message indicating successful motor identification. The user can then be presented with an option to test motor operation.

Upon successful completion of the motor identification process, the user can be prompted to submit their motor parameters to the centralized motor identification system 150 for information sharing purposes. If the user accepts, all identified motor parameters, including metadata, can be submitted via the Internet to a motor identification web service front-end, where a motor indexing algorithm can derive a unique motor index for the submitted motor. This motor index can be stored in the centralized database 182 along with the motor parameters and metadata. After review and approval by an administrator, the submitted motor data can be made available to other users for search and retrieval.

To facilitate the user interface interactions, several software and architectural design considerations can be implemented. A centralized cloud-based database 182 with a web-service front-end 180 can allow remotely-connected client applications to submit, search, and retrieve motor parameters. Additionally, a motor indexing algorithm can be used to facilitate reverse-lookup of motor metadata (make, model, dimensions, photo, etc.) from motor parameters. This motor indexing algorithm can make relative calculations based on the identified motor parameters, and create a generalized representation of the motor, called a motor index. This motor index can be used to find motors with similar characteristics, and can also be used to reverse-lookup a motor in the motor database based on identified parameters. This can enable the motor database to suggest the make, model, etc. of an otherwise unlabeled or un-identified motor.

The system can also include features to make it conducive to miniaturized applications. This can include conformance to an established standardized physical form factor, a dedicated ADC throttle signal input port 108, a dedicated Pulse Width Modulation (PWM) throttle input port 109, an external accessory port 110, and a multitude of safety and protection features.

Personal electric vehicles, multirotor drones, r/c (remote control) cars, and several other applications have established standardized form factors. The system can follow these standards by taking the form of a miniature PCB with three-phase motor connections (per motor) 102 and two-terminal power connections 142. Bulk capacitance can be provided via one or more onboard capacitors. A heat sink can provide thermal relief on the power stage side of the printed circuit board (PCB). An enclosure can be used, as this is part of the standardized form factor for personal electric vehicles.

In addition to the physical form factor, existing motor controllers used in miniaturized applications typically include either an analog throttle port or a dedicated Pulse-Width-Modulation (PWM) throttle signal input port. The system can conform to these standards by providing both a 3-pin JST analog throttle port 108, as well as a standard 3-pin, 0.1"-spaced JST connector with 5-volt power for the PWM input 109, which is capable of accepting all currently-existing throttle signal protocols, such as standard 50 Hz PPM (a.k.a. servo signal), Oneshot42, and Oneshot125. The system can also be capable of automatically detecting the protocol in use by matching the incoming throttle signal against an established set of patterns.

The system can incorporate an external accessory port 110 for connecting to external accessories, such as visibility lighting, status indicators, or displays 150. The external accessory port 110 can include a 5-volt power connection, and a digital I/O line that can be modulated to communicate with a variety of devices.

The system can incorporate several safety features, including for example reverse battery protection, MOSFET shoot-through protection, gate driver fault detection, overvoltage detection, undervoltage detection, overcurrent detection, undercurrent detection, thermal limit warning and shutdown, motor stall detection and shutdown, and throttle position safety to disable the controller if powered up with a non-zero throttle input signal.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as described herein.

We claim:

1. An electronic speed controller to control a multi-phase motor that powers a motor load, the electronic speed controller comprising:
    a motor port configured to send motor commands to the multi-phase motor and receive motor inputs from the multi-phase motor, where the motor inputs include a stator voltage and a stator current for each phase of the multi-phase motor;
    a throttle port configured to receive user commands;
    a power port configured to receive power to power the speed controller;
    a processor configured to receive the user commands and the motor inputs, to convert the stator voltages for each phase of the multi-phase motor into instantaneous stator voltages for each phase, to convert the stator currents for each phase of the multi-phase motor into instantaneous stator currents for each phase, to compute a bus voltage from the stator voltages and currents for each phase of the multi-phase motor, to compute a rotor angle, a motor speed and a rated current for the motor using a mathematical model of the motor, and to generate the motor commands based on the user commands, the bus voltage, the rotor angle, the motor speed, the rated current and the motor inputs; and
    a memory configured to store data for use by the processor.

2. The electronic speed controller of claim 1, further comprising:
    an external accessories port configured to send accessory commands to an external accessory, and to receive accessory inputs from the external accessory.

3. The electronic speed controller of claim 1, further comprising:
    a data communications port configured to communicate with external applications.

4. The electronic speed controller of claim 3, wherein one of the external applications is a motor identification system configured to provide motor parameters for use by the processor.

5. The electronic speed controller of claim 1, wherein the motor port includes a motor analog-to-digital converter (ADC), wherein the motor ADC is configured to receive the motor signals in digital form from the processor and transform those motor signals to analog form to send to the motor, and the motor ADC is configured to receive the motor inputs in analog form from the motor and transform those motor inputs to digital form to send to the processor.

6. The electronic speed controller of claim 1, wherein the throttle port includes an analog-to-digital converter (ADC) throttle input port and a pulse-width modulation (PWM) throttle input port configured to receive the user commands from a throttle unit.

7. A field oriented control method for a motor, the field oriented control method being implemented on an electronic speed controller comprising an analog-to-digital convertor (ADC) port, a throttle port and a processor, the motor being a three-phase permanent-magnet synchronous motor (PMSM) coupled to the ADC port, the field oriented control method comprising:
 continuously monitoring stator voltages and stator currents from each of the three motor phases through the ADC port;
 accessing motor parameters for the motor;
 converting the monitored stator voltages from each of the three motor phases into instantaneous stator voltage readings for each phase;
 converting the monitored stator currents from each of the three motor phases into instantaneous stator current readings for each phase;
 computing a bus voltage from the monitored stator voltages and currents from each of the three motor phases;
 processing the stator voltages and the stator currents from each of the three motor phases and the motor parameters on the processor to calculate a rotor angle, a motor speed and a rated current for the motor using a mathematical model of the motor;
 receiving user inputs for the motor through the throttle port; and
 generating motor commands for controlling the motor based on the user inputs and the calculated rotor angle, the calculated motor speed and the calculated rated current.

8. The field oriented control method of claim 7, further comprising:
 transforming the instantaneous stator current readings into an alpha current and a beta current in a stationary two-phase alpha-beta current reference frame;
 transforming the instantaneous stator voltage readings into an alpha voltage and a beta voltage in a stationary two-phase alpha-beta voltage reference frame; and
 wherein processing the stator voltages and the stator currents from each of the three motor phases and the motor parameters on the processor to calculate a rotor angle, a motor speed and a rated current comprises:
  using the alpha and beta currents, the alpha and beta voltages, the bus voltage and the motor parameters to calculate the rotor angle, the motor speed and the rated current.

9. The field oriented control method of claim 8, wherein the user inputs comprise a user speed setting, a user quadrature torque setpoint, a user direct torque setpoint and a torque/speed mode selector having a torque selection and a speed selection, and
 wherein the field oriented control method further comprises:
  transforming the alpha and beta currents in the stationary two-phase alpha-beta current reference frame into direct and quadrature currents in a direct-quadrature reference frame;
  calculating a torque direct current reference based on the user direct torque setpoint and the rated current calculated by the processor;
  computing an output direct voltage based on the torque direct current reference and the direct current in the direct-quadrature reference frame; and
 wherein when the speed selection is selected with the torque/speed mode selector, the method further comprises:
  calculating a speed based torque quadrature current reference based on the user speed setting and the motor speed calculated by the processor;
  computing an output quadrature voltage based on the speed based torque quadrature current reference and the quadrature current in the direct-quadrature reference frame; and
  generating the motor commands based on the output quadrature and direct voltages;
 wherein when the torque selection is selected with the torque/speed mode selector, the method further comprises:
  computing an output quadrature voltage based on the user quadrature torque setpoint and the quadrature current in the direct-quadrature reference frame; and
  generating the motor commands based on the output quadrature and direct voltages.

10. The field oriented control method of claim 9, wherein generating the motor commands based on the output quadrature and direct voltages comprises:
 computing output alpha and beta voltages in the alpha-beta domain based on the output quadrature and direct voltages and the rotor angle calculated by the processor;
 computing three-phase output voltages based on the output alpha and beta voltages; and
 generating sinusoidal waveforms to be sent to the motor from the three-phase output voltages.

11. The field oriented control method of claim 8, wherein the field oriented control method further comprises:
 transforming the alpha and beta currents in the stationary two-phase alpha-beta current reference frame into direct and quadrature currents in a direct-quadrature reference frame;
 calculating a torque direct current reference based on a user direct torque setpoint and the rated current calculated by the processor, the user direct torque setpoint being one of the user inputs;
 computing an output direct voltage based on the torque direct current reference and the direct current in the direct-quadrature reference frame;
 computing an output quadrature voltage based on the quadrature current in the direct-quadrature reference frame and a user speed setting or a user quadrature torque setpoint, the user speed setting and the user quadrature torque setpoint being included in the user inputs; and
 generating the motor commands based on the output quadrature and direct voltages.

12. The field oriented control method of claim 11, wherein generating motor commands based on the output quadrature and direct voltages comprises:
 computing output alpha and beta voltages in the alpha-beta domain based on the output quadrature and direct voltages and the rotor angle calculated by the processor;

computing three-phase output voltages based on the output alpha and beta voltages; and
generating sinusoidal waveforms to be sent to the motor from the three-phase output voltages.

* * * * *